July 21, 1942.  D. F. OTHMER  2,290,483
PROCESS OF SEPARATING VOLATILE CHEMICAL COMPOUNDS
Filed Aug. 2, 1939  2 Sheets-Sheet 2
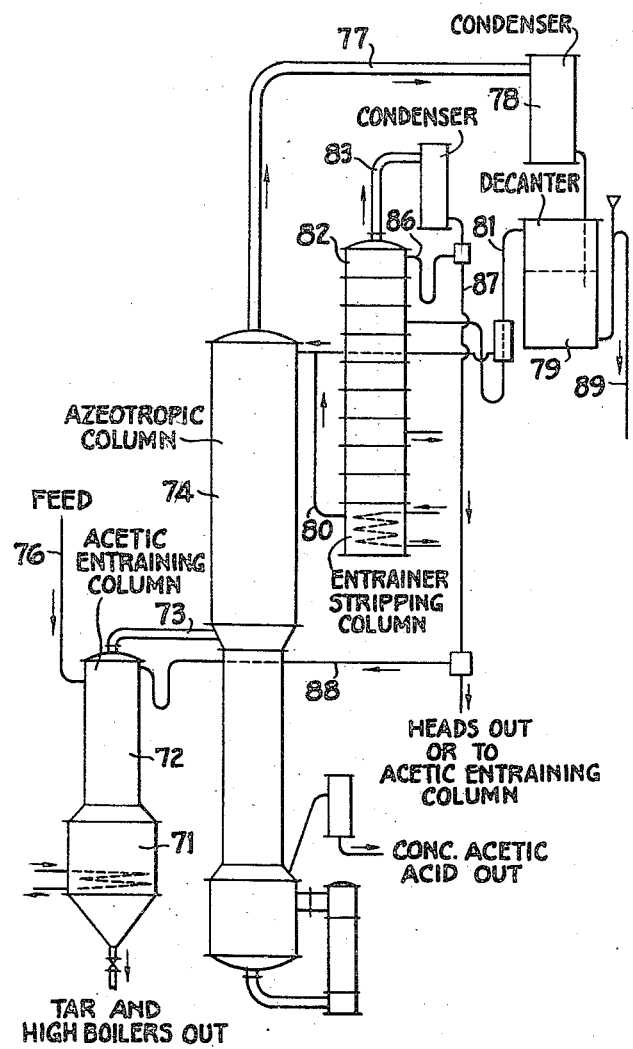
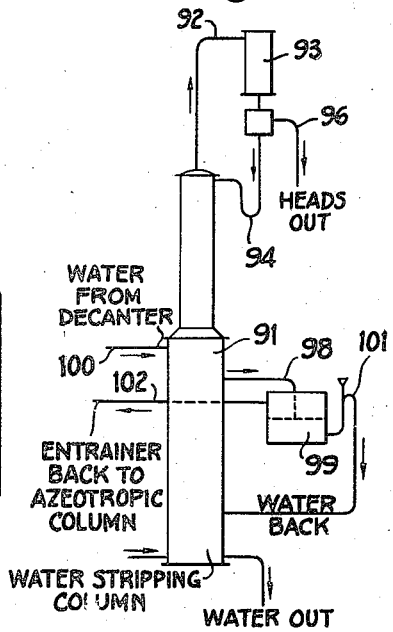
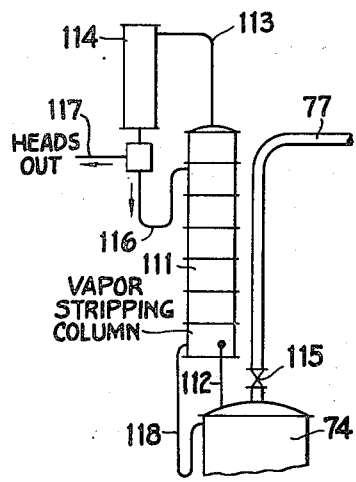
Inventor
Donald F. Othmer Patented July 21, 1942

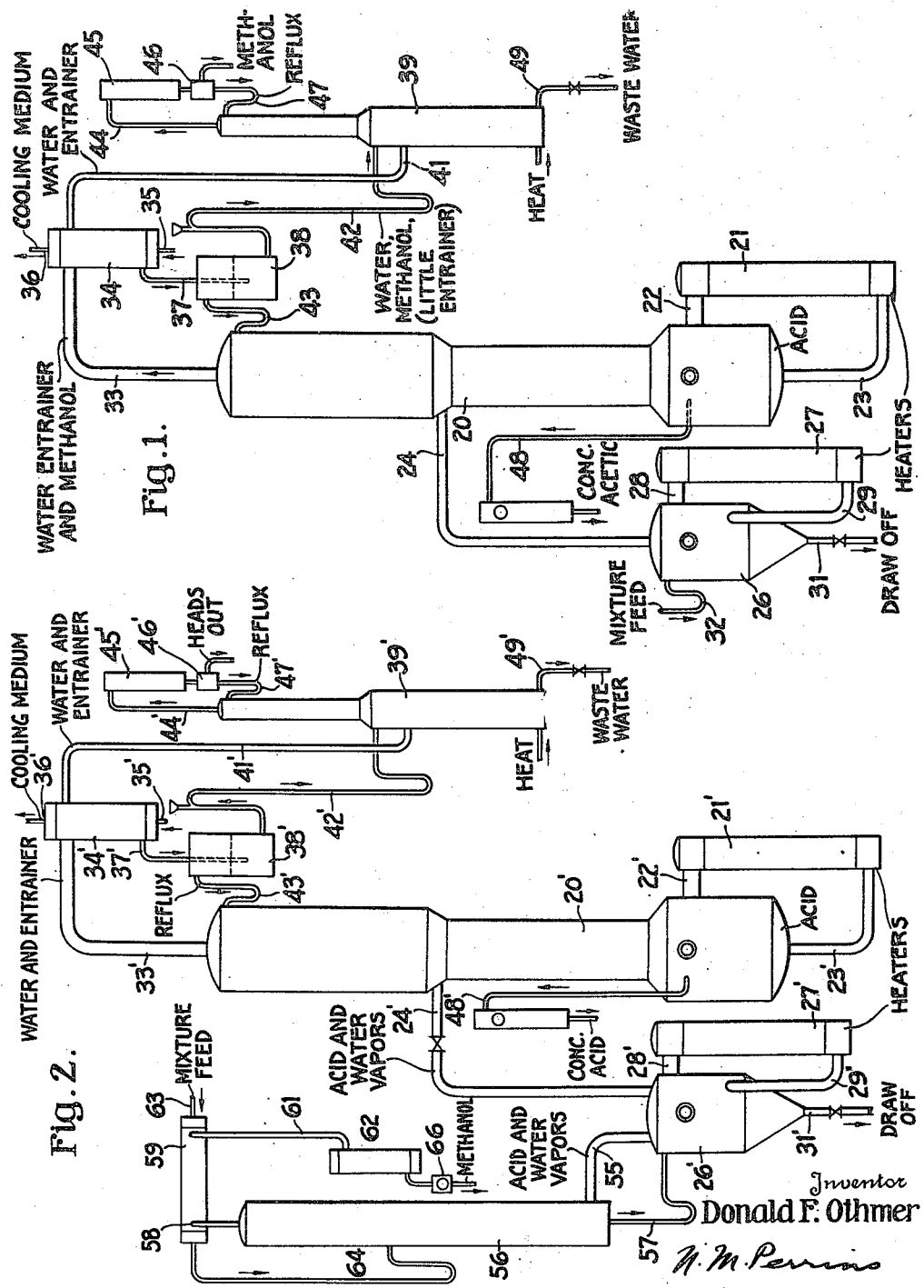

2,290,483

UNITED STATES PATENT OFFICE 2,290,483

PROCESS OF SEPARATING VOLATILE CHEMICAL COMPOUNDS

Donald F. Othmer, Coudersport, Pa., assignor to Eastman Kodak Company, Rochester, N. Y., a corporation of New Jersey Application August 2, 1939, Serial No. 287,952

5 Claims. (Cl. 202—42)

This invention relates to a process for separating chemical compounds in admixture with aqueous solutions containing at least one lower aliphatic acid and more particularly to the separation of volatile components such as methyl alcohol, ethylene dichloride or the like from aqueous solutions containing such constituents in admixture with lower aliphatic acids.

This application is a continuation-in-part of my application Serial No. 54,120, now Patent No. 2,186,617.

There are various sources of lower aliphatic acids wherein the acid is in the form of a mixture or some other type association and thereby necessitates separation before the acid may be employed commercially. For example, acetic acid present in pyroligneous liquor may be in admixture with tars, alcohol and water. The term "alcohol" as employed herein may embrace other volatile components such as acetone, allyl alcohol and the like.

Or, the acetic acid may contain various components such as cyclohexane, halogenated hydrocarbons and the like if the acetic acid has been obtained from a tar separation process or from other processes of using and/or treating acetic acid.

Certain of my prior patents and applications have described the elimination of solid materials from aqueous acid solutions. The present invention is principally directed to improved procedure for the elimination of volatile components which may be mixed with aqueous lower aliphatic acid solutions. I have developed a new process and apparatus particularly effective in the separation of volatile components such as methyl alcohol, hydrocarbon solvents and the like which may be in admixture with aqueous lower aliphatic acid solutions.

This invention has for one object to provide a process for separating certain volatile chemical materials in admixture with aqueous lower aliphatic acid solutions. Another object is to provide a process for separating mixtures of alcohol and aqueous acetic acid such as might be obtained from pyroligneous liquor. A still further object is to provide a method for separating various hydrocarbon or other solvents which may be mixed with aqueous aliphatic acid solutions. Still another object is to provide novel apparatus arrangements for carrying out my processes. Other objects will appear hereinafter.

For a better understanding of my invention, reference will be made to the attached drawings forming a part of the present application.

Fig. 1 is a semi-diagrammatic side elevation view of one form of apparatus in which several steps of my process may be carried out.

Fig. 2 is the same type of view as Fig. 1, but to another arrangement of apparatus which may be used to carry out various steps of my process, as for example methanol removal.

Fig. 3 is a semi-diagrammatic side elevation view of still another arrangement of apparatus particularly adapted for the removal of volatile hydrocarbon components which form azeotropes with acetic acid.

Fig. 4 is a semi-diagrammatic side elevation view showing in some detail the modified construction of a stripping column which may be used in any of the several apparatus set-ups described herein.

Fig. 5 is a semi-diagrammatic side elevation view showing in detail wherein, for example, the apparatus arrangement of Fig. 3 might be modified.

The construction of the apparatus as well as an understanding of the operation of my process will be apparent from the following:

Fig. 1 shows diagrammatically a form of apparatus for carrying out my invention. Numeral 20 represents the distillation column. A column of 20 to 60 plates may generally be employed. At the bottom of the column there is provided a calandria heater 21 of standard construction which is connected to the column by means of conduits 22 and 23.

At a point intermediate of the column is provided an inlet feed pipe 24 which is connected to the pre-evaporator 26. The pre-evaporator is provided with a calandria heating means 27 attached thereto by conduits 28 and 29. The pre-evaporator is also provided at its base with a valved outlet pipe 31 through which tar or other materials may be withdrawn. The pre-evaporator is also provided with an inlet 32 through which the materials to be treated may be introduced.

At the head of column 20 is provided a vapor outlet pipe 33 which is connected with condenser 34 which may be cooled with any suitable medium, such as by circulating water through pipes 35 and 36. Any condensate collecting in condenser 34 may be withdrawn by means of conduit 37 into the separator 38.

It is important to note that the condenser 34 and the decanter 38 are connected to an additional column 39 by means of the several conduits 41 and 42. Although it may be noted that a separate condenser and a separate decanter might be used to serve column 39 in place of using 34 and 38 if this should, for any reason, be desirable. The decanter is connected to column 20 by means of conduit 43.

Since column 39 is a similar construction to column 20 and comprises the vapor outlet conduit 44, the condenser 45, the decanter 46, and the reflux line 47, further detail description appears unnecessary. It should be noted that both columns 20 and 39 include the off-take means 48 and 49 for permitting withdrawal of certain components from the columns.

Considering first the operation of Fig. 1, the acid, water and other components such as methanol is fed into preevaporator 26 at 32. Heat is applied in calandria 27 and the acid, water and methanol are caused to be vaporized and pass through conduit 24 into exhausting column 20 which has been charged with butyl acetate, or other entrainer described in my Patent No. 2,050,234 and may preferably be operated as described therein. Since the butyl acetate forms an azeotrope with water boiling at around 89–92 degrees C. and since methanol boils at about 64° C., the entrainer, water and methanol pass over to condenser 34 through conduit 33. The acetic acid (B. P. 118° C.) remains in the column 20 from which it may be recovered in a vaporous state through conduit 48. Heat for this distillation is supplied by means of calandria 21.

The entrainer, water and methanol are condensed in 34 and pass to decanter 38 where these materials settle in layers. At this point it is to be noted that this condensation and decantation step may be operated in accordance with certain novel technique that may be described as "hot decantation."

The butyl acetate (entrainer) layer is returned to the column through pipe 43 as more fully described in my Patent No. 2,050,234. The water-methanol layer, which may contain some butyl acetate entrainer occluded and/or dissolved is conducted through conduit 42 to column 39.

Column 39 is operated so that the methanol may be removed as "heads" from the top of the column and any butyl acetate in its azeotrope with water from some intermediate portion of the column. That is, the base of the column is heated above about 89° C. and the top of the column maintained below about 89° C. the methanol (B. P. of 64° C.) passes out through conduit 44, is condensed at 45, and a portion withdrawn at 46, suitable reflux being returned at 47.

Any butyl acetate (entrainer) water, will in the instance under consideration, have a B. P. of about 89–92° C. with the water present and will pass through conduit 41 to condenser 34, decanter 38 and eventually back into column 20. The most of the water, B. P. 100° C., will be withdrawn to waste at 49.

It is clear that if liquid from cellulose ester manufacture was being treated it might comprise for example, acetic acid, water and low boiling solvent; the low boiling solvent being separated in a manner similar to my separating methanol from pyroligneous.

In Fig. 2, a portion of the apparatus is the same as in Fig. 1, consequently the same numerals, but with a prime attached thereto, have been employed for these corresponding parts which would appear to require no further description.

However, it is to be noted that the pre-evaporator 26' of Fig. 2 is connected by means of conduit 55 to the preliminary demethanolization column 56, the lower portion of which is joined to pre-evaporator 26' by means of conduit 57. This column is connected by outlet conduit 58 to a preliminary condenser 59, which in turn, is connected by conduit 61 to condenser 62.

Condenser 59 is of such a structure that feed conduit 63 passes therethrough in heat exchange relationship and into column 56 at some intermediate point 64. Although such heat exchange relationship may be eliminated by not passing the feed through the condenser if desired, condenser 62 is provided with a draw-off conduit 66.

If desired to recover wood oils, column 56 of Fig. 2 may have added thereto the following: an off-take pipe would be connected to the side of column 56 at some point, preferably but not necessarily in the lower half of the column. Wood oil mixed with aqueous liquor containing acetic and/or methanol and in either the liquid or vaporous phase, may then be withdrawn therethrough to a decanter of the construction already shown. In the decanter the wood oil may be separated and the other components returned to the column through a return pipe to a lower point in the column.

When employing the apparatus of Fig. 2, the acid, water and methanol mixture is fed to column 56 at 64 through conduit 63, thereby becoming heated to some extent by heat exchange with the condensing vapors in 59. Further heat is supplied at 26' and the methanol vapors pass from column 56 through conduits 58, and 61, being condensed at 62 and collected at 66.

The hot acid and water flow through conduit 57 to pre-evaporation 26' where they are vaporized, part of the vapors passing through pipe 55 to column 46 for further treatment. If the pre-evaporator is operated under pressure to obtain the advantages of so-called "Bakelite" formation described in my application Serial No. 54,120, now Patent No. 2,186,617, it will be necessary to supply a pump in line 57 to force the liquid from the lower pressure of 56 to higher pressure of 26', also a valve in 55 as well as 24' to throttle vapor to lower pressure. Acid and water vapors from 26' pass through conduit 24' into column 20' which, as already described, is charged and operated for azeotropic distillation with butyl acetate or other agent in accordance with my Patents Nos. 2,050,234 and 2,028,800 or my application 703,556.

It will be noted from Fig. 2 that any trace of head products which is not removed at 66 and thereby gets into the system 20' etc., may be separated from the upper part of 39' as described with respect to Fig. 1.

It is to be noted in the set-up of Fig. 2 that the heat for demethanolization, or in the case of acid from cellulose processing, heat of low boilers removal as well as the heat of acid-water vaporization are obtained in pre-evaporator 26'.

In order to obtain a more complete separation, I contemplate substituting or supplementing the action of the pre-evaporators in Figs. 1 and 2 by a rectifying column in series. For example, referring to either Figs. 1 or 2, a short rectifying column of any conventional construction may be inserted between pre-evaporators 26 or 26' and columns 20 or 20'. This type of arrangement will be further apparent from a consideration of Fig. 3. In Fig. 3, 71 is a pre-evaporator construction somewhat similar to that already described. However, positioned immediately above this pre-evaporator is a short rectifying column 72, such as already mentioned. This rectifying column feeds through conduit 73 to the intermediate section of azeotropic distillation column 74. The parts 73 and 74 correspond to the parts 24 and 20 of the previous figures. It will be noted that the rectifying column 72 is fed through conduit 76 near the top thereof. This arrangement causes the feed to act as reflux. In addition, when this construction is employed, the feed is preferably in a liquid phase and supplied to the rectifying column so as to furnish reflux thereto.

Column 74 is provided with a vapor off-take conduit 77 which leads through condenser 78 to decanter 79 as in the previous figures. However, in the modification shown in Fig. 3, the conduit 81 for conducting the solvent layer back to the azeotropic column 74 for reflux thereto, first passes to the interposed distillation column 82. This column is provided with a vapor off-take conduit 83, a condenser 84 and conduits 86 and 87 for distribution of the distillate therefrom. It will be noted that the distillate flowing through conduit 87 may be returned through conduit 88 to column 72.

The other layer withdrawn through conduit 89 may be conducted to columns such as shown in the previous figures or such as will be described in Fig. 4, for example.

In accordance with the operation carried out in the apparatus of Fig. 3, the feed introduced through conduit 76 might comprise an acid such as acetic acid, various solid components such as tar or cellulose ester particles and water. The column 72 would be charged with a volatile agent which forms an azeotropic mixture with the acid. A number of agents such as cyclohexene, petroleum fraction, hexane, cyclohexane and the like have been described in my application 54,120, now Patent No. 2,186,617.

Since the agent chosen forms an azeotrope with the acetic acid, it carries the acetic acid together with some water through conduit 73 into the column 74. Consequently, the tars, cellulose ester particles or other high boilers are caused to remain as residue in the pre-evaporator 71.

The mixture of acetic acid entrainer such as cyclohexene, petroleum fraction and the like introduced into column 74 is processed and with an azeotropic dehydrating agent such as butyl acetate, or other ester, ether or ketone, a number of which have been described in my Patent 2,050,234.

A mixture of the first-mentioned volatile agent, the second agent such as butyl acetate, and water, are distilled from column 74 through conduit 77 to condenser 78. The vapors are there cooled and the condensate discharged into the decanter 79, the layer from the decanter comprising the first-mentioned volatile agent, and the second agent such as butyl acetate is conducted through conduit 81 to the distillation unit 82. In this unit the volatile agent is distilled off through conduit 83, condensed at 84 and a part thereof returned through conduit 88 to column 72 for carrying further acid away from the high boiling components. A portion of the condensate from the volatile solvent would be returned through conduit 86 for reflux to the column 82. The residue of this process would comprise butyl acetate or other high boiling point water entrainer which had been employed and this residue would be conducted through conduit 80 to column 74 for removing further water from the acetic acid therein.

A high-grade acetic acid free of volatile component and water may be withdrawn from the base of column 74.

Referring to Fig. 4, 91 represents a column similar to columns 39 and 39' described in Figs. 1 and 2. The column is provided with various associated parts such as vapor off-take conduit 92, condenser 93 and reflux and draw-off conduits 94 and 96.

However, in the construction of column 91 a lower section thereof is connected by conduit 98 to decanter 99. The decanter is provided with water withdrawal conduit 101, which leads back to column 91 and the solvent withdrawal conduit 102, which would lead back to the azeotrope column 74 or in the arrangements of Figs. 1 and 2, columns 20 and 20'. That is, the construction shown in Fig. 4 may be employed as the stripping column in any of the preceding distillation arrangements.

In the operation of the apparatus of Fig. 4, the water layer from the main decanter containing an ester, ketone or ether entraining agent, methyl alcohol or other water-soluble constituents would be supplied to the column through conduit 100. Distillation would be carried out in the column and the volatile component such as methyl alcohol removed from the head of the column through conduit 96 as already described. However, in the operation of apparatus Fig. 4 a portion of the contents of the column would be withdrawn at an intermediate point through conduit 96 into the decanter 99. This portion would contain the ester, ether or ketone entraining agent and may be readily separated in decanter 99. The ester, ketone or ether layer would then be withdrawn through conduit 102 back to the azeotropic column 74, 20 or 20', depending upon the apparatus arrangement in which the column of Fig. 4 was being employed.

The water from the decantation in decanter 99 can be returned to the column through conduit 101.

Fig. 5 represents a construction which might be employed in place of the arrangement shown in Fig. 3. In this arrangement the upper portion of column 74 would be connected to the column 111 by means of conduit 112. The column is provided with a vapor off-take conduit 113, condenser 114 and reflux and withdrawal lines 116 and 117. Line 117 may be connected to column 72 (i. e., corresponding to conduit 88 of Fig. 3). A reflux line 118 is also provided for return to column 74.

In the operation of the apparatus of Fig. 5, a small fraction of all of the vapors issuing at the top of the column at conduit 77 is passed through conduit 112 into column 111. The volatile components such as cyclohexane, hexane and the like already discussed with respect to Fig. 3, would be separated out in column 111 and withdrawn through conduit 117. The acetic acid-water entrainer freed from the volatile components aforementioned, would be returned to column 74 by means of conduit 118. These returned components would be processed in column 74, as previously described, to remove the water and leave the dehydrated acetic acid as a residue.

In the operation of the set-up of Fig. 5 in order to supply to the vapors leaving the top of column 74, pressure sufficient to force them up through the column 111, a suitable valve, as for example 115, may be inserted in line 77.

The apparatus arrangements and processes which I have described possess a number of advantages. For example, in the arrangement in accordance with Fig. 1, wherein the volatile components such as methyl alcohol are moved along in the water, saving in equipment is obtained. In addition, in such procedure for treating pyroligneous liquor wherein methanol is removed after the tars have been substantially eliminated in the pre-evaporator (tar draw-off 31 of Fig. 1) there may be better operation. If a demethanolizer column operates with the raw liquor before tar removal, it is frequently subjected to considerable stoppage and plugging, due to the formation of precipitation of tars in the column. However, in accordance with the arrangement of Fig. 1, wherein the mixture has been first detarred in the pre-evaporator, such difficulties are eliminated.

The lower aliphatic acids and particularly acetic acid resulting from the operation of my process is in many instances considerably purer and clearer than that produced by prior art methods.

It is apparent from the foregoing that my invention is susceptible of some modification; hence, I do not wish to be restricted excepting insofar as is necessitated by the prior art and the spirit of the appended claims.

What I claim and desire to be secured by Letters Patent of the United States is:

1. A process for separating aqueous acetic acid from solids, methanol or tars, in admixture therewith, which comprises subjecting the mixture to heating at a temperature sufficient to volatilize and substantially simultaneously drive off acetic acid, water and methanol, thereby leaving at least a part of the tars as a residue, subjecting the acetic acid, water and methanol to an azeotropic distillation treatment in the presence of an entraining agent capable of forming an azeotrope with water, recovering the acetic acid as the tail product of this distillation, condensing the evolved vapors of water, entrainer and methanol, allowing the condensate to settle into layers, subjecting the water-methanol layer to a distillation treatment, recovering methanol as a head product in this distillation, recovering entrainer as an intermediate product and discharging the water residue to waste.

2. In a process for obtaining an acetic acid of improved quality from a mixture thereof with water and volatile alcohol components, the steps which comprise subjecting the mixture to distillation in the presence of water entrainer, simultaneously volatilizing the vaporous mixture comprised of entrainer, water and said volatile component, thereby leaving at least a partly dehydrated acetic acid as a residue, and conducting a part of the vaporous mixture into another distillation wherein the volatile component is rectified away from the water and entraining agent, which water and agent are returned to the first-mentioned distillation and withdrawing other vapors from this distillation to condensation and decantation into an entrainer layer and a water layer, returning at least a part of the decanted entrainer to the first-mentioned distillation.

3. A process for the separation and recovery of acetic acid in admixture with solids, methanol, and water which comprises heating the mixture to a temperature sufficient to substantially simultaneously volatilize off the acid, water, and said methanol, thereby leaving the solids as a residue, subjecting these components which have been simultaneously volatilized in the foregoing step, and comprising acid, water, and said methanol to further distillation in the presence of an entrainer from the group consisting of ethers, esters, and ketones, which forms an azeotrope with water, distilling off from this azeotropic distillation said methanol, water, and entrainer, thereby leaving the acid from which water has been removed as a tail product of the distillation, condensing the aforesaid components which have been distilled off and which contain methanol, allowing the condensate to separate into layers, conducting the layer having the larger content of water, and which also contains said methanol, to another distillation, recovering said methanol as a head product of this distillation, intermediate of this last-mentioned distillation withdrawing a fraction containing entrainer and water and returning this fraction to the aforesaid condensing and separation into layers.

4. A process for the separation and recovery of lower aliphatic acids in admixture with solids, alcohol, and water which comprises heating the mixture to a temperature sufficient to substantially simultaneously volatilize off said acid, water, and said alcohol, thereby leaving said solids as a residue, subjecting these components which have been simultaneously volatilized in the foregoing step, and comprising acid, water, and said alcohol to further distillation in the presence of an entrainer from the group consisting of ethers, esters, and ketones which form an azeotrope with water, distilling off from said further distillation said alcohol, water, and entrainer, thereby leaving the acid from which water has been removed as a residue of the distillation, condensing the aforesaid components which have been distilled off and which contain alcohol, allowing the condensate to separate into layers, conducting the layer having the larger content of water, and which also contains said alcohol, to another distillation, recovering said alcohol as a head product of this distillation, intermediate of this last-mentioned distillation withdrawing a fraction containing entrainer and returning this fraction to the aforesaid condensing and separation into layers.

5. A process for the separation and recovery of acetic acid in admixture with solids, a low-boiling, water-soluble solvent and water which comprises heating the mixture to a temperature sufficient to substantially simultaneously volatilize off said acid, water, and said low-boiling solvents, thereby leaving said solids as a residue, subjecting these components which have been simultaneously volatilized in the foregoing step, and comprising acid, water, and said solvent, to further distillation in the presence of an entrainer which forms with water an azeotrope having a boiling point below the boiling point of water, distilling off from this distillation said solvent, water, and entrainer, thereby leaving the acid from which water has been removed as a residue of this distillation, condensing the aforesaid components which have been distilled off and which contain said solvent, allowing the condensate to separate into layers, conducting the layer having the larger content of water, and which also contains said solvent, to another distillation, recovering said solvent as a head product of this distillation, intermediate of this last-mentioned distillation withdrawing a fraction, decanting the fraction, and returning a part thereof to preceding steps of the process.

DONALD F. OTHMER.

CERTIFICATE OF CORRECTION.

Patent No. 2,290,483.  July 21, 1942.

DONALD F. OTHMER.

It is hereby certified that error appears in the printed specification of the above numbered patent requiring correction as follows: Page 2, first column, line 45, before "water" insert a hyphen; and second column, line 28, for "column 46" read --column 56--; page 4, first column, line 52, claim 2, after "volatile" insert the word --alcohol--; and that the said Letters Patent should be read with this correction therein that the same may conform to the record of the case in the Patent Office.

Signed and sealed this 22nd day of September, A. D. 1942.

(Seal)

Henry Van Arsdale,
Acting Commissioner of Patents.